March 24, 1953   J. B. BLACK   2,632,539
POWER TRANSMISSION
Filed April 11, 1949   2 SHEETS—SHEET 2
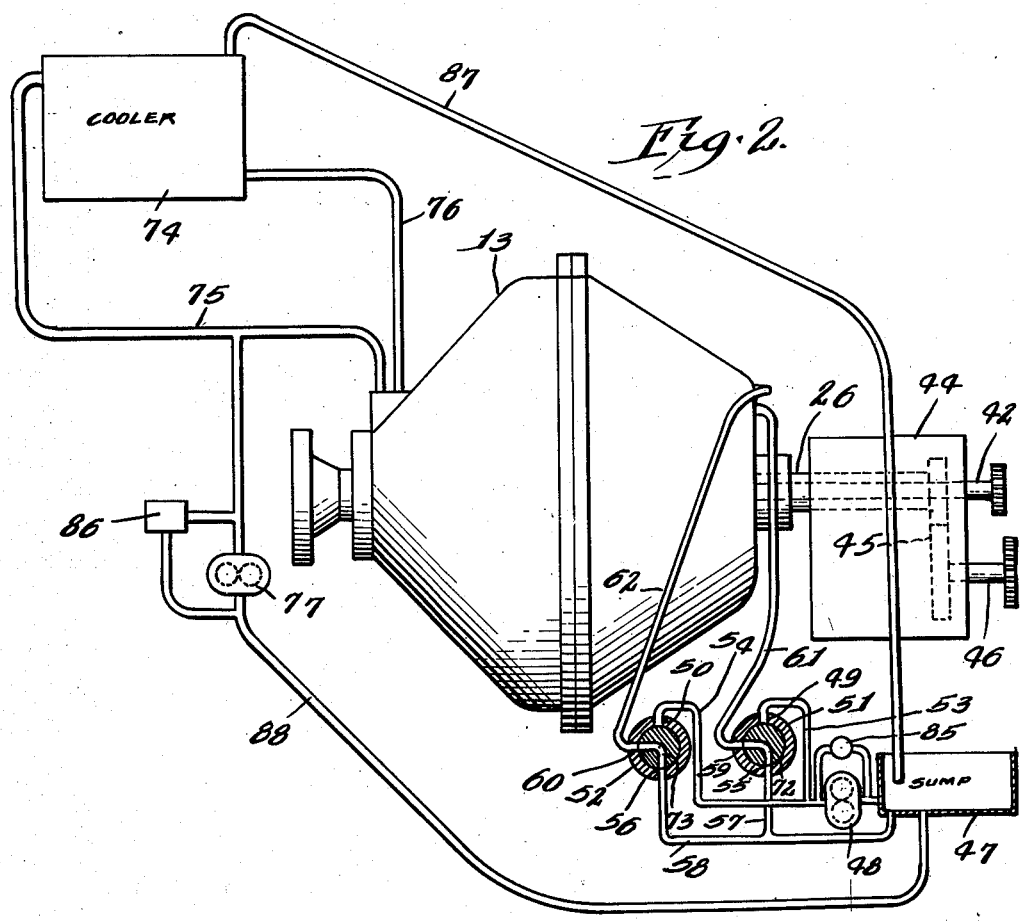
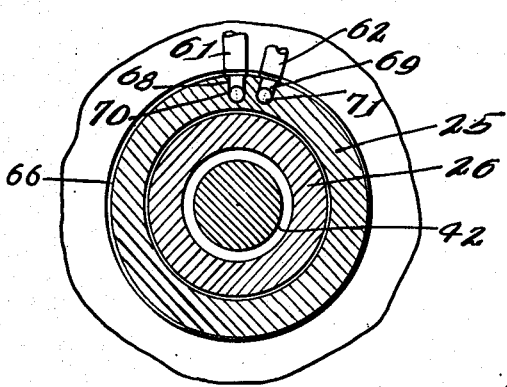
Inventor:
James B. Black.
By John M. Darley
Attorney.

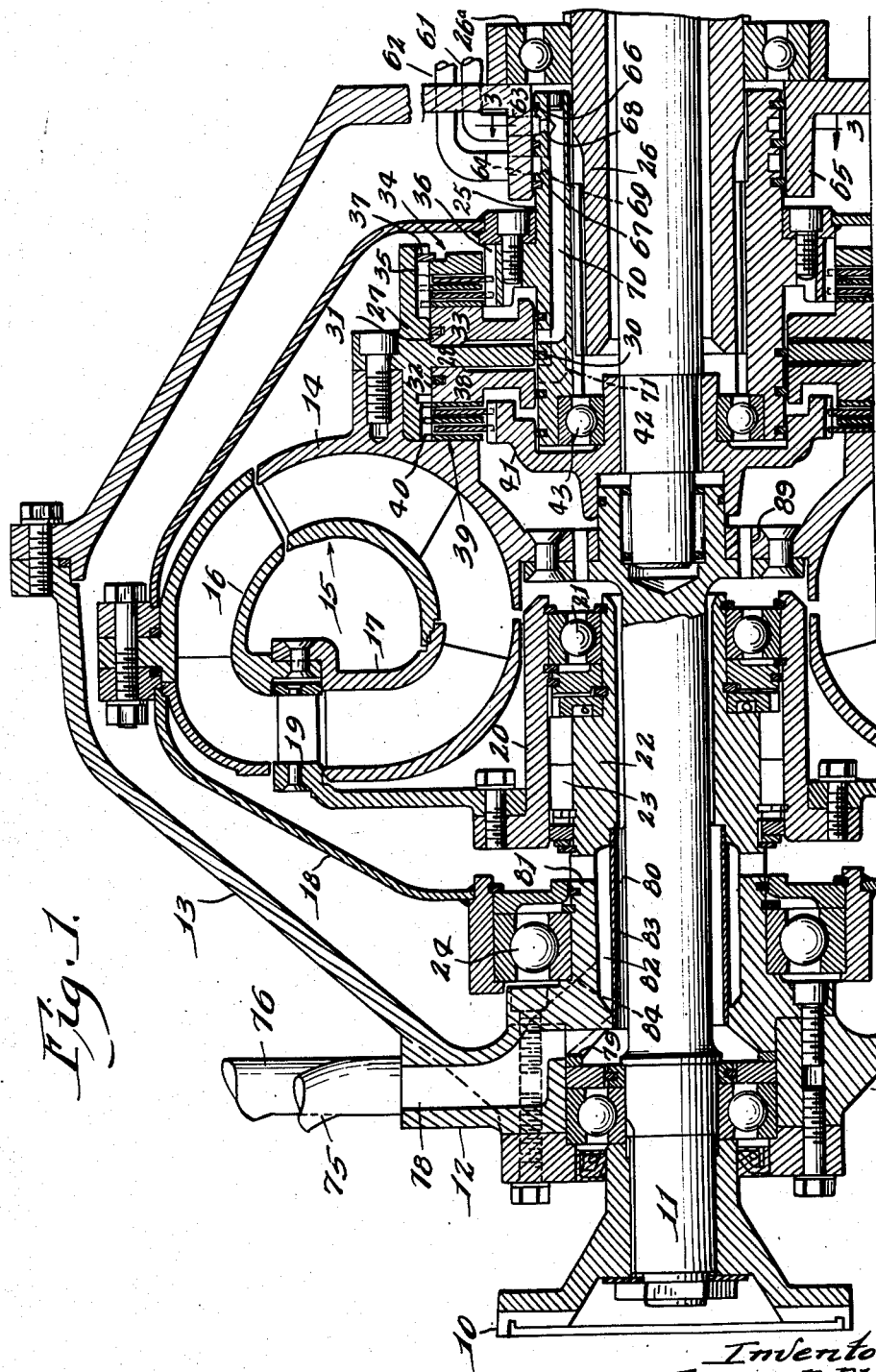

Patented Mar. 24, 1953

2,632,539

UNITED STATES PATENT OFFICE 2,632,539

POWER TRANSMISSION

James B. Black, Rockford, Ill., assignor to Twin Disc Clutch Company, Racine, Wis., a corporation of Wisconsin Application April 11, 1949, Serial No. 86,848

12 Claims. (Cl. 192—3.2)

1

My invention relates to power transmissions and more particularly to an arrangement for selectively transmitting power to a load hydraulically or directly in conjunction with a provision for effecting a power take-off from the unit.

One object of the invention is to devise a transmission which incorporates a hydraulic torque converter as the part which hydraulically transmits power and in which provision is made for a full power shift in either direction between hydraulic and direct drive.

A further object is to provide a transmission having the foregoing characteristics in which the selection of hydraulic, direct, or power take-off drive is controlled by hydraulically actuated clutches which are released by the working pressure available in the torque converter.

A further object is to devise a transmission as above indicated in which a common driving member is provided for the clutches.

These and other objects of the invention will be set forth in the following specification, reference being had to the accompanying drawings, and the novel means by which said objects are effectuated will be definitely pointed out in the claims.

In the drawings:

Fig. 1 is a sectional elevation of the upper half of the transmission, the clutches being shown in disengaged position.

Fig. 2 is a schematic view of the transmission showing the hydraulic systems for the converter and clutches and the associated gear box.

Fig. 3 is a section along the line 3—3 in Fig. 1.

Referring to Fig. 1 of the drawings, the numeral 10 designates a coupling flange that may be driven by an engine or other source of power (not shown) and which is keyed to one end of a driving or input shaft 11 that is suitably journaled in an end wall 12 of a transmission housing 13.

The inner end of the shaft 11 is flanged and riveted to a bladed pump 14 forming part of a hydraulic torque converter 15 and the outlet and inlet ends of the pump are respectively operably related to connected, bladed turbines 16 and 17 constituting first and second stages of the converter and which are secured to an annular casing 18 whose ends are journaled in the manner presently described. A bladed reaction member 19 is located between the turbines 16 and 17 and functions in the characteristic manner when power is transmitted through the converter. The reaction member 19 is bolted to a sleeve 20 that is journaled by means of a bear-

2 ing 21 on one end of a sleeve 22 which is concentric with and spaced from the shaft 11 and whose opposite end is secured to the housing end wall 12. Interposed between the sleeves 20 and 22 is a free-wheel or overrunning clutch 23 of characteristic construction which is arranged to hold the reaction member 19 stationary during power transmission through the converter and to permit its rotation with the pump 14 and turbines 16 and 17 during direct drive. The left end of the converter casing 18, as viewed in Fig. 1, is journaled by a bearing 24 on the sleeve 22, while the right end of the casing is secured to a sleeve 25 that has splined connection to a coaxial, driven or output sleeve 26 which extends outwardly of the housing 13 for attachment to a load in the manner presently described and is journaled in a bearing 26ª carried by the housing 13. The foregoing includes all parts necessary to transmit power hydraulically to the driven sleeve 26.

Direct drive from the shaft 11 to the sleeve 26 and a power take-off from the pump 14 are provided by the following instrumentalities.

For direct drive, a driving shell 27 is secured to the pump 14 in encircling and spaced relation to the sleeve 25 and between the ends of the shell an annular wall 28 extends interiorly thereof, the inner edge face of the wall being slightly spaced from the outer surface of the sleeve 25 and having sealing relation therewith by means of a piston ring seal 30 carried by the sleeve. The wall serves as the fixed base of a pair of oppositely related, coaxial, annular cylinders 31 and 32 whose outer walls are defined by the shell 27 and the inner walls by the sleeve 25.

An annular piston 33 is slidably mounted in the cylinder 31 in actuating relation to a plurality of clutch plates 34, alternate plates having driven and sliding relation with an interior splined portion 35 of the shell 27 while the intervening plates have driving and sliding relation with an exterior splined portion 36 on the sleeve 25. The piston 33 and plates 34 constitute the direct drive clutch of the transmission and when the piston 33 is moved towards the right, as viewed in Fig. 1, the plates are gripped against an abutment ring 37 carried by the shell 27, thus establishing a direct driving connection between the pump 14 and the driven sleeve 26 through the sleeve 25.

For the power take-off drive, an annular piston 38 is slidable in the cylinder 32 in actuating relation to a plurality of clutch plates 39, alternate plates having driven and sliding relation with an interior, splined portion 40 of the shell 27 while the intervening plates have driving and sliding relation with the splined periphery of a ring 41 that is keyed or otherwise secured to a power take-off shaft 42. The latter shaft is coaxial with and has its left end piloted in the adjacent end of the driving shaft 11. Interposed between the hub of the ring 41 and the adjacent end of the sleeve 25 is a bearing 43.

The piston 38 and plates 39 constitute the power take-off clutch of the unit which provides a means for directly connecting the pump 14, and hence the driving shaft 11, to the power take-off shaft 42. The latter shaft extends through the driven sleeve 26 in coaxial and spaced relation thereto and a suggested manner of connecting these parts to their respective loads is diagrammatically illustrated in Fig. 2 to which reference will now be made.

The sleeve 26 extends within a gear box 44 and is connected through a gear train 45 with a load shaft 46 which is offset from the sleeve, while the power take-off shaft 42 extends beyond the end of the sleeve 26 and through the gear box for connection to its load.

The direct drive and power take-off clutches are selectively and hydraulically actuated to engaging position by an external source of pressure which is established and controlled in the following manner. A suitable sump 47 (see Fig. 2) or other collecting agency contains the actuating liquid, usually an oil, which is drawn therefrom by a gear pump 48 whose discharge is delivered to the inlet ports 49 and 50 of direct and power take-off valves 51 and 52 through pipes 53 and 54, all respectively. The valves 51 and 52 also include return ports 55 and 56 which are connected by pipes 57 and 58, all respectively, with the sump 47, and also with outlet ports 59 and 60 which connect by way of pipes 61 and 62 with the outer ends of radial passages 63 and 64 (see Fig. 1), all respectively, provided in an annular, inward flange 65 forming part of the housing 13. The sleeve 25 extends and sealingly fits within the flange 65.

The inner ends of the passages 63 and 64 constantly register with annular channels 66 and 67 provided on the outer surface of the sleeve 25 and these channels communicate by way of radial passages 68 and 69 with longitudinal passages 70 and 71, all respectively, the passages 68, 69, 70 and 71 being located in the sleeve 25. As indicated in Fig. 3, the passages 70 and 71 are circumferentially spaced in the sleeve 25 and their outer or right ends, as viewed in Fig. 1, are plugged, while their opposite ends bend radially outward of the sleeve and register, respectively, with the cylinders 31 and 32 between the wall 28 and the pistons 33 and 38, the heads of the pistons being slightly recessed to facilitate entrance of the pressure liquid.

With the clutches in the disengaged position shown, the cylinders 31 and 32 are connected to the sump 47 by way of the passages and pipes referred to above since the L-passage 72 in the rotor of the direct clutch valve 51 connects the outlet and return ports 59 and 55 of this valve, respectively, while the similarly shaped passage 73 in the rotor of the power take-off clutch valve 52 connects the outlet and return ports 60 and 56 of this valve, respectively. In their other positions, i. e., when rotated clockwise through an angle of 90°, the passage 72 connects the inlet and outlet ports 49 and 59, while the passage 73 connects the inlet and outlet ports 50 and 60. The valves 51 and 52 may be independently or simultaneously controlled to establish pressure in the respective clutch cylinders depending upon the necessities of operation.

Instead of employing springs as a separating or disengaging medium for the plates of the two clutches, advantage is taken of the basic hydraulic pressure which is effective in the converter during operation as a means of preventing cavitation between the blades. This basic pressure is established by a separate hydraulic system including a cooler 74 (see Fig. 2) which is connected to the housing 13 by supply and return pipes 75 and 76, respectively. A vent pipe 87 connects the top of the cooler 74 with the sump 47 and a pipe 88 connects the sump to the pipe 75, the pipe 88 including a gear pump 77 which may be suitably driven from the input shaft 11, as is also the pump 48.

The delivery end of the supply pipe 75 (see Fig. 1) communicates by way of connecting radial passages 78 and 79 in the housing end wall 12 and the left end of the sleeve 22, respectively, with the left end of the annular passage 80 between the shaft 11 and sleeve 22 and the oil supplied to this passage flows to the inlet end of the pump 14 and fills the converter casing 18. The working oil is withdrawn from the casing 18 through radial passages 81 in the sleeve 22 whose inner ends communicate with an annular chamber 82 formed by recessing a part of the inner surface of the sleeve, the chamber being separated from the annular space 80 by an annular shell 83 which bridges the recess. The recess in turn communicates with an inclined passage 84, shown dotted in Fig. 1, which connects by way of a radial passage (not shown) with the return pipe 76, the latter passage being circumferentially spaced from and lying in the same plane transverse of the transmission as the passage 78.

The two oil systems are separate from each other, except that they use a common oil and sump, suitable seals, such as piston ring seals, being employed wherever necessary to insure this condition. Therefore, the oil in the system which includes the pump 48 is only effective, as selectively controlled, against the pistons 33 and 38 in directions to engage the respective clutches, while the oil in the other system, in addition to hydraulically transmitting power through the converter, also is effective against the opposite sides of the pistons 33 and 38 in directions tending to disengage the clutches. The converter pressure is effective against the piston 38 in a releasing direction through one or more passages 89 in the flanged connection of the converter pump 14 to the input shaft 11, while as regards the piston 33, converter pressure acts against the right side thereof in a releasing direction. In the latter instance, it will be noted that the right hand plate of the assembly denoted by the numeral 34 is spaced from the splined portion 36 of the sleeve 25 and has sliding toothed connection with the splined portion 35 of the shell 27 so that when the piston 33 is moved to a release position by the converter pressure, the latter is balanced on opposite sides of the right hand plate which therefore cannot exercise any reengaging movement of the clutch plates 34. Hence, by properly relating the pressure in the two systems, the clutches may be selectively engaged and disengaged. A characteristic basic pressure in the converter may be of the order of 50 p. s. i., while in the other system, the pressure may be of the order of 100 p. s. i. Pressure relief valves 85 and 86 of usual construction are bridged around the pumps 48 and 77, respectively, to relieve the supply pipes leading therefrom when the pressure therein exceeds a predetermined value.

In describing the operation of the transmission, it will be assumed that there is a means (not shown) for securing a suitable neutral before or after the transmission and that the direct and power take-off clutches are disengaged as shown in Fig. 1 since the valves 51 and 52 are conditioned as shown in Fig. 2. When the shaft 11 is positively connected to the engine, the drive is through the converter, i. e., through the pump 14, turbines 16 and 17, casing 18 and sleeve 25 to the driven or output sleeve 26. The reaction member 19 is held from rotating in a reverse direction by the overrunning clutch 23, thus providing the required changes in flow direction of the working liquid. Converter drive provides high starting torque and capacity for rapid, smooth acceleration.

When the output sleeve 26 attains the desired speed for any given load, it will ordinarily be desirable to shift to direct drive. This result is accomplished by rocking the rotor of the valve 51 until the passage 72 connects the ports 49 and 59, thus admitting oil pressure established by the pump 48 through the pipes and passages referred to above to the cylinder 31 and shifting the piston 33 to grip the plates 34. The drive is then transmitted from the pump 14 through the direct drive clutch to the sleeve 25 and thence to the output sleeve 26 whose speed is equalized with that of the engine.

During direct drive, the pump 14 and turbines 16 and 17 rotate at the same or engine speed. Hence, there will not be any reaction against the blades of the reaction member 19 which, as it is released by the overrunning clutch 23, will begin to rotate with the pump and turbines. Since power is not then being transmitted through the converter and all parts thereof are rotating at substantially the same speed, the power losses in the converter circuit are negligible. Actually, the reaction member 19 rotates at a slightly slower speed than the pump and turbines due to the drag of the bearings and the overrunning clutch, but the difference is small.

If the load becomes too heavy to be carried in direct drive, the rotor of the valve 51 is rocked to the position shown in Fig. 2, thus interrupting the pressure connection between the pump 48 and the cylinder 31 and connecting the latter to the sump. The basic pressure in the converter casing 18 then shifts the piston 33 to the position shown in Fig. 1 and the direct clutch is disengaged and power drive is then through the converter.

The principal advantage of the above construction is that the transmission is characterized by a full power shift since the engine is never completely disconnected from the load. As load conditions vary, the drive through the transmission may be shifted at will from hydraulic to direct drive and vice versa and the full power shift characteristic is present under either condition.

Since the power take-off clutch is interposed between the pump 14 and power take-off shaft 42, this clutch may be engaged and disengaged at will during either hydraulic or direct drive through the main part of the transmission. Engagement of the power take-off clutch is effected by rocking the rotor of the valve 52 until the passage 73 connects the ports 50 and 60, thus admitting pressure from the pump 48 to the cylinder 32 and shifting the piston 38 to grip the plates 39. Drive is then from the pump 14 and through the plates 39 and ring 41 to the power take-off shaft 42. Disengagement is accomplished by returning the rotor of the valve 52 to the position shown in Fig. 2, thus connecting the cylinder 32 with the sump 47. The basic pressure within the converter casing 18 then shifts the piston 38 to the release position shown in Fig. 1 and power flow to the shaft 42 is interrupted.

I claim:

1. In a power transmission, the combination of an input shaft, an output shaft, a hydraulic torque converter including a pump member connected to the input shaft and a turbine member connected to the output shaft for providing hydraulic power transmission between the shafts, a casing enclosing and rotatable with the converter and filled with the working liquid, means for constantly maintaining a predetermined pressure on the working liquid in the converter and casing, and hydraulically actuated clutch means including a piston within the casing shiftable between positions providing and interrupting a direct connection between the shafts, parts of the clutch means being connected to and carried by the pump and the piston being exposed to pressure in the casing which tends to shift the clutch means to a disengaged position, the casing pressure being less than the engaging pressure for the clutch means.

2. In a power transmission, the combination of an input shaft, an output shaft, a hydraulic torque converter including a pump member connected to the input shaft and a turbine member connected to the output shaft for providing hydraulic power transmission between the shafts, a casing enclosing and rotatable with the converter and filled with the working liquid, hydraulically actuated clutch means including a piston within the casing shiftable between positions providing and interrupting a direct connection between the shafts, parts of the clutch means being connected to and carried by the pump member, and first and second, hydraulic pressure systems for respectively constantly maintaining a predetermined pressure on the working liquid in the converter and casing and for supplying pressure to the clutch means to engage the same, the piston being exposed to the pressure in the casing which tends to shift the clutch means to disengaging position and the casing pressure being less than the engaging pressure for the clutch means.

3. In a power transmission, the combination of an input shaft, an output shaft, a hydraulic torque converter including a pump member connected to the input shaft and a turbine member connected to the output shaft for providing hydraulic power transmission between the shafts, a casing enclosing and rotatable with the converter and filled with the working liquid, a cylindrical shell having an interior and annular, transverse wall carried by the pump member in coaxial and spaced relation to the output shaft, a sleeve encircling the output shaft and providing a driving connection between the casing and output shaft, the shell, sleeve and wall defining an annular cylinder, an annular piston slidable in the cylinder, clutch plates respectively connected to the shell and sleeve and gripped by the piston when moved in one direction to establish a direct drive connection between the shafts, a hydraulic pressure system including a control valve for supplying liquid to the cylinder on one side of the piston to engage the plates, and means for maintaining a predetermined pressure on the working liquid in the converter and casing, the opposite side of the piston being exposed to the casing pressure which tends to shift the piston to a position in which the clutch plates are disengaged and the casing pressure being less than the engaging pressure for the clutch plates.

4. In a power transmission, the combination of an input shaft, an output shaft, a hydraulic torque converter including a pump member connected to the input shaft and a turbine member connected to the output shaft for providing hydraulic power transmission between the shafts, a casing enclosing and rotatable with the converter and filled with the working liquid, a cylindrical shell having an interior and annular, transverse wall carried by the pump member in coaxial and spaced relation to the output shaft, a sleeve encircling the output shaft and providing a driving connection between the casing and output shaft, the shell, sleeve and wall defining an annular cylinder, an annular piston slidable in the cylinder, clutch plates respectively connected to the shell and sleeve and gripped by the piston when moved in one direction to establish a direct drive connection between the shafts, a hydraulic pressure system including a passage in the sleeve and a control valve for supplying liquid to the cylinder on one side of the piston to engage the plates, and means for maintaining a predetermined pressure on the working liquid in the converter and casing, the opposite side of the piston being exposed to the casing pressure which tends to shift the piston to a position in which the clutch plates are disengaged and the casing pressure being less than the engaging pressure for the plates.

5. In a power transmission, the combination of an input shaft, an output sleeve, a power take-off shaft coaxial with and extending through the sleeve, a hydraulic torque converter including a pump member connected to the input shaft and a turbine member connected to the output sleeve for providing hydraulic power transmission between the input shaft and sleeve, and first and second clutch means selectively and independently operable to respectively provide a direct connection between the input shaft and output sleeve and between the input shaft and power take-off shaft, parts of each clutch means being connected to and carried by the pump member.

6. In a power transmission, the combination of an input shaft, an output sleeve, a power take-off shaft coaxial with and extending through the sleeve, a hydraulic torque converter including a pump member connected to the input shaft and a turbine member connected to the output sleeve for providing hydraulic power transmission between the input shaft and sleeve, a casing enclosing and rotatable with the converter and filled with the working liquid, means for maintaining a predetermined pressure on the working liquid in the converter and casing, and first and second, hydraulically actuated clutch means each including a piston in the casing selectively and independently operable to respectively provide a direct connection between the input shaft and output sleeve and between the input and power take-off shafts, parts of each clutch means being connected to and carried by the pump member and each piston being exposed to the pressure in the casing which tends to shift the associated clutch means to disengaging position, the casing pressure being less than the engaging pressure for each clutch means.

7. In a power transmission, the combination of an input shaft, an output sleeve, a power take-off shaft coaxial with and extending through the sleeve, a hydraulic torque converter including a pump member connected to the input shaft and a turbine member connected to the output sleeve for providing hydraulic power transmission between the input shaft and sleeve, a casing enclosing and rotatable with the converter and filled with the working liquid, first and second, hydraulically actuated clutch means each including a piston within the casing respectively shiftable between positions providing and interrupting direct connections between the input shaft and output sleeve and between the input shaft and power take-off shaft, parts of each clutch means being connected to and carried by the pump member, a hydraulic pressure system for maintaining a predetermined pressure on the working liquid in the converter and casing, and a separate, hydraulic pressure system for supplying engaging pressure to the clutch means including a valve for each clutch means to selectively control the engagement thereof, each piston being exposed to the pressure in the casing which tends to shift the associated clutch means to disengaging position and the casing pressure being less than the engaging pressure for each clutch means.

8. In a power transmission, the combination of an input shaft, an output sleeve, a power take-off shaft coaxial with and extending through the sleeve, a hydraulic torque converter including a pump member connected to the input shaft and a turbine member connected to the output sleeve for providing hydraulic power transmission between the input shaft and sleeve, a casing enclosing and rotatable with the converter and filled with the working liquid, a cylindrical shell having an interior and annular, transverse wall carried by the pump member in coaxial and spaced relation to the output sleeve, the wall being located between the ends of the shell, an intermediate sleeve encircling the output sleeve and providing a driving connection between the casing and output sleeve, the shell, intermediate sleeve and wall defining oppositely related, first and second annular cylinders, an annular piston slidable in each cylinder, first clutch plates respectively connected to one end of the shell and intermediate sleeve and gripped by the piston in the first cylinder when moved in one direction to establish a direct drive connection between the input shaft and output sleeve, second clutch plates respectively connected to the other end of the shell and power take-off shaft and gripped by the piston in the second cylinder when moved in one direction to establish a direct drive connection between the input and power take-off shafts, a hydraulic pressure system including a control valve for each cylinder for selectively and independently supplying liquid to each cylinder on one side of the associated piston to engage the associated clutch plates, and means for maintaining a predetermined pressure on the working liquid in the converter and casing, the opposite side of each piston being exposed to the casing pressure which tends to shift the respective pistons to positions in which the associated clutch plates are disengaged and the casing pressure being less than the engaging pressure for the clutch plates.

9. In a power transmission, the combination of an input shaft, an output shaft, a first hydraulic pressure system including a hydraulic torque converter having a pump member and a turbine member respectively connected to the input and output shafts, and means for constantly maintaining a predetermined pressure on the working liquid in the converter, and a second hydraulic pressure system including a hydraulically actuated clutch having a piston exposed at one end thereof to pressure in the second system and valve means for determining the admission of pressure to the second system to engage the clutch and provide a direct drive between the shafts, the piston being exposed at the opposite end to pressure in the first system and moved thereby to a disengaged position to provide converter drive between the shafts when pressure in the second system is interrupted and the pressure in the second system being greater than that in the first system.

10. In a power transmission, the combination of an input shaft, an output shaft, a first hydraulic pressure system including a hydraulic torque converter having a pump member and a turbine member respectively connected to the input and output shafts, and means for constantly maintaining a predetermined pressure on the working liquid in the converter, and a second hydraulic pressure system including a hydraulically actuated piston having a piston exposed at one end thereof to pressure in the second system and valve means for determining the admission of pressure to the second system to engage the clutch and provide a direct drive between the shafts, parts of the clutch being connected to the pump and other parts to the output shaft, the clutch being exposed at the opposite end to pressure in the first system and moved thereby to a disengaged position to provide converter drive between the shafts when pressure in the second system is interrupted and the pressure in the first system being less than that in the second system.

11. In a power transmission, the combination of an input shaft, an output member, a power take-off shaft, a hydraulic torque converter including a pump member connected to the input shaft and a turbine member connected to the output member for providing hydraulic power transmission between the input shaft and output member, and first and second clutch means selectively and independently operable to respectively provide a direct connection between the input shaft and output member and between the input shaft and power take-off shaft, parts of each clutch means being connected to and carried by the pump member.

12. In a power transmission, the combination of an input shaft, an output member, a power take-off shaft, a hydraulic torque converter including a pump member connected to the input shaft and a turbine member connected to the output member for providing hydraulic power transmission between the input shaft and output member, a casing enclosing and rotatable with the converter and filled with the working liquid, means for maintaining a predetermined pressure on the working liquid in the converter and casing, and first and second, hydraulically actuated clutch means each including a piston in the casing selectively and independently operable to respectively provide a direct connection between the input shaft and output member and between the input and power take-off shafts, parts of each clutch means being connected to and carried by the pump member and each piston being exposed to the pressure in the casing which tends to shift the associated clutch means to disengaging position, the casing pressure being less than the engaging pressure for each clutch means.

JAMES B. BLACK.

REFERENCES CITED

The following references are of record in the file of this patent:

UNITED STATES PATENTS

| Number | Name | Date |
| --- | --- | --- |
| 2,351,483 | Carnagua | June 13, 1944 |
| 2,360,710 | Nutt et al. | Oct. 17, 1944 |